United States Patent Office 2,807,593
Patented Sept. 24, 1957

2,807,593

PREPARATION OF CHROMIA-CONTAINING HYDROGELS

Robert M. Dobres, Wenonah, N. J., assignor to Socony Mobil Oil Company, Inc., a corporation of New York No Drawing. Application August 28, 1953,
Serial No. 377,253

6 Claims. (Cl. 252—465)

This invention relates to an improved process for preparing hydrogels comprising chromia and at least one oxide of another metal, the hydroxide of said metal being characterized by substantial insolubility in water. More particularly, the present invention relates to a method for preparing true hydrogels, free of ionic impurities, comprising a major proportion of chromia and a substantial proportion of a second metal oxide. The invention is specifically concerned with a method for preparing a cogelled catalytic composite of chromia and one or more metal oxides.

The distinction between true hydrogels and gelatinous precipitates is important to an understanding of the objects of the invention. The prior art has frequently confused these terms, reference being often made to a gel or hydrogel when it is obvious that the product so misnamed is a gelatinous precipitate. Using silica as an outstanding example, a true hydrogel may be formed by adding water glass to acid in such concentrations and proportions that a clear hydrosol is formed, which thereafter congeals to a firm, resilient hydrogel containing all of the water of the hydrosol. If, on the other hand, acid is added to water glass, a gelatinous precipitate of silica separates out which may be readily separated from the principal portion of the aqueous medium by filtration. Whenever the precipitate formed is of a composite nature, that is, of two or more inorganic oxides, the product is inhomogeneous due to the fact that the metal oxides do not precipitate in the same ratio throughout the acid addition period. This lack of homogeneity has been shown to adversely affect the catalytic properties of inorganic oxide composites. Furthermore, the precipitates are structurally weak. These two major disadvantages are encountered whether or not the final product is wholly gelatinous or in the form of a hydrogel in which large amounts of precipitate are occluded.

The present invention is concerned with a method for preparing true hydrogels as distinguished from gelatinous precipitates on the basis of the above definition. In addition to chemical homogeneity and mechanical strength of true hydrogels, the latter may readily be prepared in the form of spheroidal particles by well known methods, for example, that described in U. S. 2,385,217. According to the process of that patent, a gelable hydrosol having an appreciable but preferably short gelation time is injected into a body of a water-immiscible liquid. The hydrosol separates in the water-immiscible liquid into a plurality of units which assume spheroidal shape. The hydrosol globules remain in the water-immiscible liquid until gelation occurs, whereupon they are removed, washed and dried. The dried product is in the form of hard transparent to translucent beads similar in general appearance to glass beads but containing a tremendous number of extremely fine pores. The hard smooth surfaces and spheroidal shape of these beads renders them very resistant to breakage and attrition losses.

The success of the bead gel technique depends upon the fact that gelation time of various inorganic oxide sols may be readily controlled. The gelation time is dependent upon concentration, temperature, and pH. Many inorganic oxides may form component parts of hydrogels under varying conditions and many of them may be formed into true hydrogels without substantial difficulty. However, the known techniques cannot be applied to form hydrogels containing a major proportion of chromia and a substantial proportion of one or more other metal oxides, the hydroxide of said metal being substantially insoluble in water.

Composites of chromia and metal oxides falling within the above category have heretofore been prepared. One method heretofore employed is that described in U. S. 2,098,959, which involves precipitating together in aqueous solution the gelatinous hydroxides of chromia and a second metal such as aluminum, zirconium, thorium, magnesium, and titanium. In such instance, the two or more metallic salts may be dissolved together in water and the hydrous oxides precipitated by the addition of an excess of alkali such as ammonium, sodium, or potassium hydroxide. Generally, the metals, aside from chromium, are introduced in the form of their alkali salts in aqueous solution. The resultant gelatinous precipitate obtained by this procedure is washed with water, dried, granulated, and finally heated to reaction temperature. As will be apparent, composites prepared by the foregoing method are gelatinous precipitates rather than true hydrogels. Composites prepared by the above-described method further contain ionic impurities, such as alkali metal ions, introduced by the use of the alkali metal reactants. Intensive water-washing of the composite is necessary to remove such ionic impurities and in many cases ion exchange methods must be employed to reduce the concentration of ionic impurities to a desired minimum.

It is a primary object of the present invention to provide a process for preparing true hydrogels of chromia and one or more metal oxides containing no substantial amounts of gelatinous precipitates. A further object of the invention is the preparation of hydrogels free of ionic impurities and comprising a major proportion of chromia and a substantial proportion of at least one other metal oxide, the hydroxide of said metal being substantially insoluble in water. A still further object of the invention is the provision of a method for preparing a hydrogel comprising a major proportion of chromia and a minor proportion of at least one other metal oxide in a substantially pure state at the time of its formation, thereby eliminating the need for washing or ion exchange.

The above and other objects which will be apparent to those skilled in the art are attained in accordance with the present invention. Broadly stated, the instant invention involves a method for preparing a hydrogel comprising a major proportion of chromia and a minor proportion of one or more metal oxides by adding an aqueous solution of chromic acid to an alcoholic solution or suspension of one or more metal alcoholates. The resulting mixture affords a hydrosol which, upon lapse of a suitable period of time, sets to a true hydrogel. Setting times can be varied widely. Neither washing nor ion exchange of the resultant hydrogel is required. The hydrogel, after drying to remove the bulk of solvent, is a lustrous black, granular, amorphous material.

It is a feature of the present invention that the only reactants required are aqueous chromic acid solution and a metal alcoholate contained in an alcohol. The use of additional peptizing agents and catalysts has not been found necessary in effecting the desired hydrosol. Without being limited by any theory, it is believed that two processes producing the desired oxides, namely, acid hydrolysis of the alcoholate and alcoholic reduction of chromic trioxide, occur more or less simultaneously, forming a homogeneous collodial dispersion of the components. The chromic acid reactant serves three purposes in that it catalyzes the hydrolysis of the alcoholate; it peptizes the metallic oxide obtained in the hydrolysis; and it constitutes the source of chromia.

In general, hydrogels containing, on a dry basis, 70 to 95 percent by weight of chromia and 5 to 30 percent by weight of at least one other metal oxide are suitably prepared by the process of this invention. It has been found that such hydrogels containing no substantial amount of gelatinous precipitate and free of ionic impurities may be prepared, at a pH of below 4 and preferably in the range of 2.5 to 3, by adding an aqueous chromic acid solution to an alcoholic solution of a metal alcoholate, the choice of metal in said alcoholate being dependent upon the composition desired in the resulting hydrosol but said metal being characterized by a hydroxide which is substantially insoluble in water.

The compositions prepared by the method described herein, after drying, may be defined as plural metal oxide gels containing chromia. Such gels comprise a major proportion of chromia and a minor proportion of at least one other metal oxide, the hydroxide of said metal being characterized by substantial insolubility in water. Hydrogels prepared in accordance with the present process may be binary composites, such as chromia-alumina, chromia-zirconia, chromia-titania, chromia-magnesia, chromia-beryllia, chromia-molybdena, and chromia-thoria hydrogels, or they may be ternary mixtures such as chromia-alumina-zirconia, chromia-alumina-beryllia, chromia-magnesia-thoria, and the like.

The resulting gel products are suitable for hydrocarbon conversion processes involving the reactions of cracking, reforming, isomerization, polymerization, desulfurization, dehydrocyclization, etc. These gel catalysts are especially adapted to promote the reforming of lighter fractions such as gasoline so as to increase the rate of production of high anti-knock gasoline. The hydrogels of this invention may be prepared for use as catalysts by gelling in vats or the like and then breaking up the gel. The gels may be used as broken fragments or as pellets prepared by molding or extruding. The method of the invention is particularly adaptable to the preparation of hydrogels in the form of spheroidal bead-like particles.

The resultant hydrogel is desirably air-dried at room temperature (20–30° C.) to remove the bulk of solvent and then dried at about 100 to about 150° C. The product generally still contains some hexavalent chromium present as a difficultly reducible complex of the oxides of both $Cr^{+3}$ and $Cr^{+6}$. To obtain a product of maximum catalytic activity, it is necessary to control the reduction of hexavalent chromium at a severity level below that which is sufficient to effect a rapid exothermal crystallization of the chromic oxide. This rapid exothermal crystallization is accompanied by a decrease in surface area and has been referred to as the "glow phenomena" because the temperature rise is often sufficient to heat the material to incandescence. It is further important to reduce the $Cr^{+6}$ phase before crystallization occurs. Accordingly, the hydrogel, after drying, is suitably reduced by flowing a stream of excess reducing gas over the gel particles at a temperature between about 400 and about 600° F. Suitable reducing gases include hydrogen, carbon monoxide, and ammonia. The hydrogel is desirably slowly heated to a temperature in the above range at a rate not exceeding about 5° F. per minute and held at a temperature in the above range until reduction of hexavalent chromium is substantially complete. This reduction usually requires a period of from about 6 to about 20 hours. The gel product being maintained in the reducing atmosphere is then slowly heated at a rate not exceeding about 5° F. per minute to a final temperature of between about 900 and about 1200° F. It is essential that the hydrogel be heated sufficiently slowly in 400–600° F. range so that the unglowed condition of the chromia component of the gel is substantially preserved. Heating of the hydrogel product of this invention is carried out sufficiently slowly, that is, less than about 5° F. per minute, in order that the chromia content of the gel is not subjected to the aforementioned premature glow phenomena.

The alcohol employed as a solvent or suspending medium for the metal alcoholate in the present process is a low molecular weight alcohol of less than 5 carbon atoms. Thus, suitable alcohols include methyl, ethyl, propyl, isopropyl, butyl, secondary butyl, and tertiary butyl. Isopropyl alcohol has been found to be particularly satisfactory as a solvent in the present procedure by virtue of its reduction potential for chromic acid, the volatility of the excess alcohol, as well as its oxidation product of acetone, and the fact that gelation occurs very readily in this medium.

The alcoholate used as a reactant in the present process is suitably one derived from a low molecular weight alcohol generally having less than 5 carbon atoms. The metal of the alcoholate is characterized by a water-insoluble hydroxide. Thus, suitable metal alcoholate reactants include magnesium ethylate, aluminum isopropoxide, zirconium methylate, beryllium butyrate, molybdenum ethylate, thorium propylate, titanium ethylate, etc. It is not essential that the alcoholate be completely soluble in the alcohol solvent since partially soluble metal alcoholates may be employed in the form of suspensions in the alcohol.

It is necessary that the pH of the hydrosols prepared in accordance with the present process be below 4 and preferably in the range of 2.5 to 3. While the maximum pH under a given set of conditions depends on the total solids content and on the chromia content, it has been found that hydrosols prepared at a pH above about 4 failed to congeal to the desired hydrogel but remained in the liquid sol stage even after an excessively long time of set.

The following examples will serve to illustrate the method of the invention:

*Example 1*

One hundred twenty grams of distilled aluminum isopropoxide were melted in an anhydrous atmosphere, then poured after cooling into 1500 cc. of stirred isopropyl alcohol. This mixture was cooled in an ice bath and stirred while 185 milliliters of cold aqueous chromium trioxide (500 grams per liter) were added during 30 minutes at a temperature of 10 to 12° C. Stirring was continued for 30 minutes, at the end of which time the hydrosol, having a pH of 2.7, was poured at 2° C. into a large tray. Gelation occurred in 10 minutes. The bulk of solvent was removed by static air-drying, followed by heating in a 105° C. steam oven for 20 hours. One hundred forty-two grams of hard, lustrous black granules were obtained.

A sample of the above-prepared gel (71 grams) was reduced in hydrogen (100 cc. per minute) by heating at a rate of 3° F. per minute to 510° F., maintaining this temperature for 3 hours and heating at the same rate to 590° F., maintaining this temperature for 10 hours and finally heating to 1000° F. The yield of product was 50 grams. This product contained 30 percent by weight alumina and 70 percent by weight chromia, and had a surface area of 145 square meters per gram.

*Example 2*

To a solution containing 52 milliliters of titanium ethylate in 1400 milliliters of isopropyl alcohol, cooled in an ice bath, were added, with stirring, 210 milliliters of a cold aqueous chromic trioxide solution (500 grams per liter). The time of addition was 30 minutes, during which the solution temperature rose from 4° C. to 15° C. Stirring was continued for 20 minutes, after which the resulting hydrosol, having a pH of 2.6, was poured at 4° C. into a large tray. Gelation occurred in 60 minutes. The bulk of solvent was removed by static air-drying, followed by heating in a 105° C. oven for 24 hours. A yield of 132 grams of lustrous black granules was obtained.

A sample of the prepared gel (71 grams) was reduced in hydrogen (100 cc. per minute) by heating at a rate of about 3° F. per minute to 500° F., maintaining this temperature for 19 hours, then heating at the same rate to 1000° F. After cooling in hydrogen, 52 grams of lustrous black granules were obtained. This product contained 20 percent by weight titania and 80 percent by weight chromia, and had a surface area of 120 square meters per gram.

Example 3

To a suspension of 28.5 grams of magnesium methylate in 1430 cc. of isopropyl alcohol, cooled in an ice bath to 10–12° C., were added, over a period of 30 minutes, with stirring, 237 milliliters of cold aqueous solution of chromium trioxide (500 grams per liter). Stirring was continued for 20 minutes, after which the hydrosol, having a pH of 2.85, was poured at 6° C. into a tray to gel. The bulk of solvent was removed by static air-drying, followed by heating for 24 hours at 105° C. A yield of 140 grams of lustrous black granules was obtained.

A sample of the above-prepared gel (63 grams) was reduced in hydrogen (100 cc. per minute) for 24 hours at 485° F. after heating to this temperature at a rate of about 3° F. per minute. Heating was continued at this same rate to a final temperature of 950° F. After cooling in hydrogen, 46 grams of granular product were obtained. This product contained 10 percent by weight magnesia and 90 percent by weight chromia, and had a surface area of 56 square meters per gram.

The gels of the above examples were tested as catalysts for dehydrocyclization activity with normal heptane at atmospheric pressure, at 900° F., a liquid hourly space velocity of 1 and a one-hour run. Immediately before the run, the sample was pretreated with hydrogen for 30 minutes. Conversion to toluene was determined from the refractive index of the product liquid. The data are set forth in the following table:

| Catalyst | Toluene | Weight percent coke based on charge | Gram atoms carbon per mole of toluene | Mole percent hydrogen in gas |
|---|---|---|---|---|
| Example 1 | 32.0 | 3.0 | 0.8 | 91.1 |
| Example 2 | 35.4 | 8.9 | 2.8 | 90.8 |
| Example 3 | 34.3 | 2.5 | 0.6 | 92.9 |

From the above data, it will be seen that the gel composites prepared in accordance with the present method are active dehydrocyclization catalysts.

In order to illustrate the importance of pH control of the hydrosol, the following examples were carried out:

Example 4

To a suspension of 28.5 grams of magnesium ethylate in 1430 cc. of isopropyl alcohol, cooled in an ice bath, were added, over a period of 30 minutes, with stirring, 237 milliliters of cold aqueous solution of chromium trioxide (500 grams per liter). Stirring was continued for 20 minutes, after which the hydrosol, having a pH of 2.9, was poured at 6° C. into a tray to gel. Gelation occurred in 40 minutes. The resultant hydrogel had a solids content of 6 percent by weight and contained 90 percent chromia and 10 percent magnesia by weight on a dry basis.

Example 5

To a suspension of 8.6 grams of magnesium ethylate in 190 cc. of isopropyl alcohol, cooled in an ice bath, were added, over a period of 3 minutes, with stirring, 31.6 milliliters of cold aqueous solution of chromium trioxide (500 grams per liter). Stirring was contined for 15 minutes, after which the hydrosol, having a pH of 5.7 was poured at about 10° C. into a tray to gel. The hydrosol so prepared had a solids content of 7 percent by weight and contained 80 percent chromia and 20 percent magnesia by weight on a dry basis. This hydrosol, due to the high pH, failed to set to a hydrogel even after 24 hours.

From the foregoing, it will be evident that pH of the hydrosol is an important factor influencing the preparation of chromia-containing hydrogels produced by the present process and that the pH of the hydrosol so formed should accordingly be maintained within the limits set forth hereinabove.

I claim:

1. A method for preparing a catalytic composite consisting essentially of a major proportion of chromia and a minor proportion of at least one oxide of a metal selected from the group consisting of aluminum, zirconium, titanium, magnesium, beryllium, molybdenum, and thorium, which comprises forming a hydrosol having a pH of less than 4 and characterized by an inherent capacity to set to a hydrogel without addition to or subtraction from said sol of any substance, by admixing an aqueous solution of chromic acid with an alcoholic solution of a metal alcoholate derived from a metal of the aforesaid group and an alcohol of less than 5 carbon atoms, said solution of chromic acid serving to provide the source of said chromia, to catalyze the hydrolysis of said alcoholate and to peptize the metal oxide obtained in the hydrolysis, retaining in said sol substantially all the constituents thereof until gelation occurs, drying the resulting hydrogel, contacting the dried hydrogel with a reducing gas while simultaneously raising the temperature thereof to 400–600° F. at a sufficiently slow rate that unglowed condition of the chromia component is preserved, maintaining the gel in the reducing atmosphere at the aforesaid temperature until reduction of hexavalent chromium present in the gel is substantially complete, then slowly heating the gel in the reducing atmosphere to a temperature in the range of 900 to 1200° F. and thereafter cooling the resulting heat-treated gel.

2. A method for preparing a catalytic composite consisting essentially of a major proportion of chromia and a minor proportion of at least one oxide of a metal selected from the group consisting of aluminum, zirconium, titanium, magnesium, beryllium, molybdenum, and thorium, which comprises forming a hydrosol having a pH of less than 4 and characterized by an inherent capacity to set to a hydrogel without addition to or subtraction from said sol of any substance, by admixing an aqueous solution of chromic acid with an alcoholic solution of a metal alcoholate derived from a metal of the aforesaid group and an alcohol of less than 5 carbon atoms, said solution of chromic acid serving to provide the source of said chromia, to catalyze the hydrolysis of said alcoholate and to peptize the metal oxide obtained in the hydrolysis, retaining in said sol substantially all the constituents thereof until gelation occurs, drying the resulting hydrogel, contacting the dried hydrogel with a reducing gas while simultaneously raising the temperature thereof to 400–600° F. at a rate not exceeding about 5° F. per minute, maintaining the gel in the reducing atmosphere at the aforesaid temperature until reduction of hexavalent chromium present in the gel is substantially complete, then slowly heating the gel in the reducing atmosphere to a temperature in the range of 900 to 1200° F. and thereafter cooling the resulting heat-treated gel.

3. A method for preparing a catalytic composite consisting essentially of a major proportion of chromia and a minor proportion of at least one oxide of a metal selected from the group consisting of aluminum, zirconium, titanium, magnesium, beryllium, molybdenum, and thorium, which comprises forming a hydrosol having a pH in the range of 2.5 to 3 and characterized by an inherent capacity to set to a hydrogel without addition to or subtraction from said sol of any substance, by admixing an aqueous solution of chromic acid with an alcoholic solution of a metal alcoholate derived from a metal of the aforesaid group and an alcohol of less than 5 carbon atoms, said solution of chromic acid serving to provide the source of said chromia, to catalyze the hydrolysis of said alcoholate and to peptize the metal oxide obtained in the hydrolysis, retaining in said sol substantially all the constituents thereof until gelation occurs, drying the resulting hydrogel, contacting the dried hydrogel with a reducing gas while simultaneously raising the temperature thereof to 400–600° F. at a rate not exceeding about 5° F. per minute, maintaining the gel in the reducing atmosphere at the aforesaid temperature until reduction of hexavalent chromium present in the gel is substantially complete, then heating the gel in the reducing atmosphere at a rate not exceeding about 5° F. per minute to a temperature in the range of 900 to 1200° F. and thereafter cooling the resulting heat-treated gel.

4. A method for preparing a catalytic composite consisting essentially of a major proportion of chromia and a minor proportion of alumina, which comprises forming a hydrosol having a pH of less than 4 and characterized by an inherent capacity to set to a hydrogel without addition to or subtraction from said sol of any substance by admixing an aqueous solution of chromic acid with an aluminum alcoholate of an alcohol of less than 5 carbon atoms contained in a low molecular weight alcohol of less than 5 carbon atoms, said solution of chromic acid serving to provide the source of said chromia, to catalyze the hydrolysis of said alcoholate and to peptize aluminum oxide obtained in the hydrolysis, retaining in said sol substantially all the constituents thereof until gelation occurs, drying the resulting hydrogel, contacting the dried hydrogel with a reducing gas while simultaneously raising the temperature thereof to 400–600° F. at a sufficiently slow rate that unglowed condition of the chromia component is preserved, maintaining the gel in the reducing atmosphere at the aforesaid temperature until reduction of hexavalent chromium present in the gel is substantially complete, then slowly heating the gel in the reducing atmosphere to a temperature in the range of 900 to 1200° F. and thereafter cooling the resulting heat-treated gel.

5. A method for preparing a catalytic composite consisting essentially of a major proportion of chromia and a minor proportion of magnesia, which comprises forming a hydrosol having a pH of less than 4 and characterized by an inherent capacity to set to a hydrogel without addition to or subtraction from said sol of any substance by admixing an aqueous solution of chromic acid with a magnesium alcoholate of an alcohol of less than 5 carbon atoms contained in a low molecular weight alcohol of less than 5 carbon atoms, said solution of chromic acid serving to provide the source of said chromia, to catalyze the hydrolysis of said alcoholate and to peptize magnesium oxide obtained in the hydrolysis, retaining in said sol substantially all the constituents thereof until gelation occurs, drying the resulting hydrogel, contacting the dried hydrogel with a reducing gas while simultaneously raising the temperature thereof to 400–600° F. at a sufficiently slow rate that unglowed condition of the chromia component is preserved, maintaining the gel in the reducing atmosphere at the aforesaid temperature until reduction of hexavalent chromium present in the gel is substantially complete, then slowly heating the gel in the reducing atmosphere to a temperature in the range of 900 to 1200° F. and thereafter cooling the resulting heat-treated gel.

6. A method for preparing a catalytic composite consisting essentially of a major proportion of chromia and a minor proportion of titania, which comprises forming a hydrosol having a pH of less than 4 and characterized by an inherent capacity to set to a hydrogel without addition to or subtraction from said sol of any substance by admixing an aqueous solution of chromic acid with a titanium alcoholate of an alcohol of less than 5 carbon atoms contained in a low molecular weight alcohol of less than 5 carbon atoms, said solution of chromic acid serving to provide the source of said chromia, to catalyze the hydrolysis of said alcoholate and to peptize titanium oxide obtained in the hydrolysis, retaining in said sol substantially all the constituents thereof until gelation occurs, drying the resulting hydrogel, contacting the dried hydrogel with a reducing gas while simultaneously raising the temperature thereof to 400–600° F. at a sufficiently slow rate that unglowed condition of the chromia component is preserved, maintaining the gel in the reducing atmosphere at the aforesaid temperature until reduction of hexavalent chromium present in the gel is substantially complete, then slowly heating the gel in the reducing atmosphere to a temperature in the range of 900 to 1200° F. and thereafter cooling the resulting heat-treated gel.

References Cited in the file of this patent

UNITED STATES PATENTS

| Number | Name | Date |
|---|---|---|
| 2,098,959 | Frey et al. | Nov. 16, 1937 |
| 2,382,582 | Ruthruff | Aug. 14, 1945 |
| 2,636,865 | Kimberlin | Apr. 28, 1953 |
| 2,638,455 | Pitzer | May 12, 1953 |
| 2,713,037 | Kimberlin | July 12, 1955 |